United States Patent [19]

Higashimura et al.

[11] Patent Number: 4,724,781
[45] Date of Patent: Feb. 16, 1988

[54] SPREADING AND LAYING MACHINE FOR SPEED NURSERY STRIP

[75] Inventors: Einosuke Higashimura, Tokyo; Mitsuru Yoshimi, Okazaki; Yotsuo Yamada, Yokohama, all of Japan

[73] Assignees: Mitsubishi Rayon Eng. Co. Ltd., Tokyo; Shiun-Nihon Ryokugaku Co. Ltd., Aichi, both of Japan

[21] Appl. No.: 27,047

[22] Filed: Mar. 23, 1987

Related U.S. Application Data

[63] Continuation of Ser. No. 745,519, Jun. 17, 1985, abandoned.

[30] Foreign Application Priority Data

Jun. 20, 1984 [JP] Japan ................... 59-125376
May 16, 1985 [JP] Japan ................... 60-102679

[51] Int. Cl.$^4$ ................................ A01C 1/04
[52] U.S. Cl. ............................ 111/1; 111/10; 47/56
[58] Field of Search ............... 47/9, 56, 1, 58; 111/1, 111/8–12, 52, 85, 87, 88; 405/37, 38, 176

[56] References Cited

U.S. PATENT DOCUMENTS

| | | | |
|---|---|---|---|
| 3,315,623 | 4/1967 | Tschudy | 47/9 |
| 3,905,313 | 9/1975 | Grether | 47/56 |
| 3,980,029 | 9/1976 | Huggertt | 47/56 |
| 4,037,544 | 7/1977 | Cantone | 111/6 |
| 4,066,490 | 1/1978 | Yoshimi | 47/56 |
| 4,145,980 | 3/1979 | Boots | 111/10 |
| 4,175,496 | 11/1979 | Rehbein | 47/56 |
| 4,492,271 | 1/1985 | Doering | 172/125 |
| 4,636,112 | 1/1987 | Raviv | 405/176 |

FOREIGN PATENT DOCUMENTS

| | | | |
|---|---|---|---|
| 70444 | 10/1947 | Denmark | 111/10 |
| 0015800 | 9/1980 | European Pat. Off. | 111/1 |
| 2008164 | 10/1970 | Fed. Rep. of Germany | 111/10 |
| 2647159 | 4/1977 | Fed. Rep. of Germany | 405/38 |
| 1452690 | 8/1966 | France | 111/87 |
| 294573 | 4/1965 | Netherlands | 172/78 |
| 718530 | 2/1980 | U.S.S.R. | 405/176 |

Primary Examiner—James R. Feyrer
Attorney, Agent, or Firm—Wegner & Bretschneider

[57] ABSTRACT

A machine suitable for use in spreading and laying a seed nursery strip, especially, a lawn nursery strip over the ground is equipped with means for spreading and laying the seed nursery strip over the ground; means for firming the thus-laid seed nursery strip; and means for clawing the top soil of the ground in front of the spreading and laying means and then evenly sprinkling the thus-clawed top soil as top dressing soil over the thus-firmed seed nursery strip. The seed nursery strip can thus be automatically and stably spread and laid even if they have somewhat weak tensile strength and at the same time, top dressing soil can be applied over the thus-laid nursery strips.

5 Claims, 3 Drawing Figures

SPREADING AND LAYING MACHINE FOR SPEED NURSERY STRIP

This application is a continuation of U.S. application Ser. No. 745,519, filed June 17, 1985 now abandoned.

BACKGROUND OF THE INVENTION

(1) Field of the Invention

This invention relates to a machine suitable for use in spreading and laying a seed nursery strip, especially, a lawn nursery strip, and more specifically to a machine for automatically spreading and laying a seed or lawn nursery strip at a high speed over a bare ground and at the same time, sprinkling a predetermined amount of top dressing soil automatically and evenly over the thus-spread and laid lawn nursery strip.

(2) Description of the Prior Art

Seed nursery strips have each been produced by distributing seeds, fertilizers and the like between two layers of paper sheets, non-woven rayon fabrics or the like and then bonding them at suitable locations. In order to dry the thus-applied binder or glue, this conventional production process requires a drying step. Accordingly, such conventional seed nursery strips were accompanied by a drawback that due to the heat applied during the heating step, the germination percentages of their seeds were lowered.

Upon rooting, germination and subsequent growth of lawn grass seeds, their roots have high elongation pressures while their sprouts are prevented from growing even by slightest contact to obstacles. It is therefore indispensable to avoid such obstacles.

The above drawbacks have been solved by seed nursery strips proposed by one of the present inventors (see, U.S. Pat. No. 4,066,490 issued Jan. 3, 1978 to Mitsuru Yoshimi and entitled "METHOD FOR PRODUCING A LAWN NURSERY STRIP", which is incorporated herein by reference.). However, the above-proposed seed nursery strips have a tensile strength as low as 5 kg/cm. When they are laid manually, they tend to develop crumples if they are pulled by somewhat large forces in their longitudinal directions, thereby lifting them up from the ground. Even if the seeds in the thus-lifted seed nursery strips are allowed to germinate owing to water sprinkled after their spreading and laying, they cannot propagate their roots into the ground and thus result in death. When spreading and laying such seed nursery strips manually, it requires considerable skill in sprinkling top dressing soil evenly to a thickness of 3–5 mm over the thus-laid seed nursery strips. If workers step on the thus-laid seed nursery strips, they may undesirably be cut off or crumpled. Furthermore, their spreading and laying work requires lots of manpower and tremendous labor.

SUMMARY OF THE INVENTION

With the foregoing in view, this invention intends to permit, even with the above-mentioned conventional seed nursery strips having a tensile strength of about 5 kg/50 cm or so, their automatic spreading and laying work over a bare ground without development of crumples and at the same time, even sprinkling of top dressing soil over the thus-laid seed nursery strips to a desired thickness. An object of this invention is thus to provide a machine suitable for use in spreading and laying a seed nursery strip and equipped with the above-described function.

In one aspect of this invention, there is accordingly provided a spreading and laying machine for a seed nursery strip, which comprises:

means for spreading and laying the seed nursery strip on the ground;

means for firming the thus-spread and laid seed nursery strip; and means for clawing the top soil of the ground in front of the spreading and laying means and then evenly sprinkling the thus-clawed top soil as top dressing soil over the thus-firmed seed nursery strip.

By connecting the spreading and laying machine of this invention to a tractor or the like and drawing the former by the latter, the above-described construction of the spreading and laying machine of this invention allows to claw the top soil in an amount equivalent to a desired thickness of top dressing soil and then to sprinkle the thus-clawed top soil rearwards. In rear of the clawing means, the seed nursery strip is spread and laid, and is then firmed. The above-clawed top soil is sprinkled over the thus-firmed seed nursery strip. Therefore, the seed nursery strip is spread and laid while covering it with the thus-sprinkled top soil. In this manner, it is possible to spread and lay seed nursery strips, even those susceptible to cutting or breakage under tensile forces, without problems and at the same time, to evenly cover the thus-laid seed nursery strips with desired amounts of top dressing soil.

The above and other objects, features and advantages of the present invention will become apparent from the following description and the appended claims, taken in conjunction with the accompanying drawings.

DETAILED DESCRIPTION OF THE INVENTION AND PREFERRED EMBODIMENTS

Figure 1:
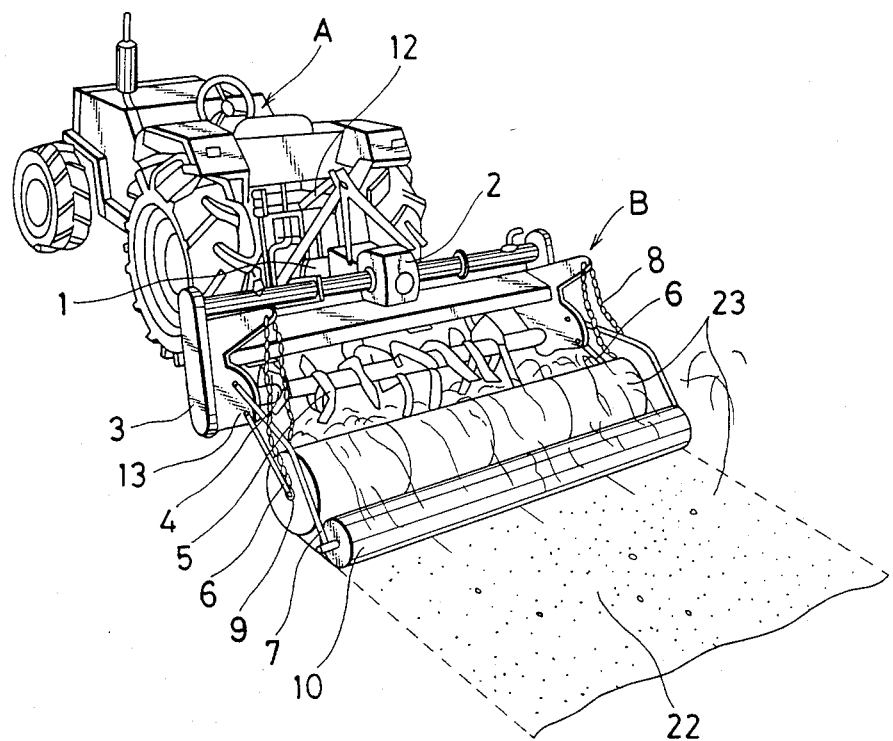
FIG. 1 is a perspective view of a spreading and laying machine according to one embodiment of this invention, which machine is drawn by a tractor to spread and lay lawn nursery strips.
Figure 3:
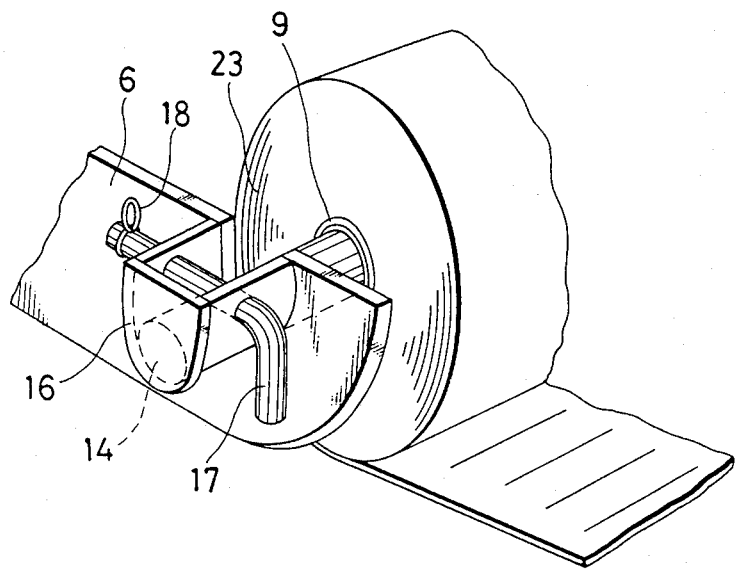
FIG. 3 is a fragmentary perspective view of the spreading and laying machine of FIG. 1, illustrating certain members which hold and support rotatably one end of a strip-loaded roller.

Referring first to FIG. 1, designated at letter A is a tractor of such a type that has conventionally been used for cultivation. The tractor A is provided at a rear part thereof with a drive shaft 1 which is driven in association with its axle. The drive shaft 1 is usually connected to a tiller or the like, whereby not only to draw the latter but also to operate the latter. Letter B generally indicates the spreading and laying machine according to the one embodiment of this invention, as applied by way of example to lawn nursery strips 23. In this spreading and laying machine B, numeral 2 indicates a power input shaft connected to the drive shaft 1 of the tractor A. A drive force, which has been transmitted to the power input shaft 2, is transmitted as rotary powers to both sides, where they rotate a rotary shaft 4 for example by way of drive chains (not shown). A suitable number of top soil claws 5 are fixedly secured on the circumferential wall of the shaft 4. Owing to rotation of the rotary shaft 4, the claws 4 scrape and dig the ground to a predetermined depth and then throw and sprinkle the thus-dug top soil rearwards. The claws 5 may have the same shape as those employed in cultivators. Designated at numeral 3 is a chain case. In rear of the rotary shaft 4 and at both sides of the main body of the spreading and laying machine B, there are respectively provided support plates 13. Each support bar 6 and each support arm 7 are both pivotally attached at their front ends to their corresponding support plate 13. Their rear ends are rotatably connected to a shaft 14, on which a nursing strip roller 9 is mounted, and to a shaft 21 of a firming roller 10 respectively. Designated at numeral 8 are chains, each of which extends through an upper part of the corresponding support plate and is connected at both ends thereof to the corresponding support bar 6 and support arm 7 respectively. Each of the chains 8 has such a length that when the spreading and laying machine B is lifted upward upon turning the tractor A, the chain 8 can prevent the nursery strip roller 9 and firming roller 10 from being hung down and dragged on the ground in spite of their pivotal connection to the corresponding support plates 13. On the nursery strip roller 9, a suitable number of rolled long lawn nursery strips 23 (four rolls are shown by way of example in FIG. 1) are loaded side by side. Each end of the shaft 14 is, as illustrated in FIG. 3, detachably received in a support 16 which is provided in a rear end portion of the corresponding support bar 6. Namely, the upward movement of each end portion of the shaft 14 which end portion is received in a pocket of the corresponding support 16 is limited by a corresponding stopper rod 17 extending horizontally through the associated support 16 while permitting free rotation of the corresponding end portion in the pocket of the support 16. The stopper rod 17 is bent at its rear end portion to limit its frontward insertion beyond the bent portion. A pin 18 extends through a front end portion of the stopper rod 17, whereby preventing the stopper rod 17 from slipping off rearward. After spreading and laying the lawn nursery strips 23 over the ground, the nursery strip roller 9 can be readily removed from the shaft 14 by pulling the pin 18 off from the stopper rod 17, pulling the stopper rod 17 out of the support 16 and then removing the shaft 14 from the support 16. Another roller 9 which carries fresh rolls of lawn nursery strips 23 thereon are then fit over the shaft 14. The shaft 14 is then put back to the supports 16 in a manner opposite to the above-described procedure. It is now ready to resume the spreading and laying work of lawn nursery strips over the ground.

Figure 2:
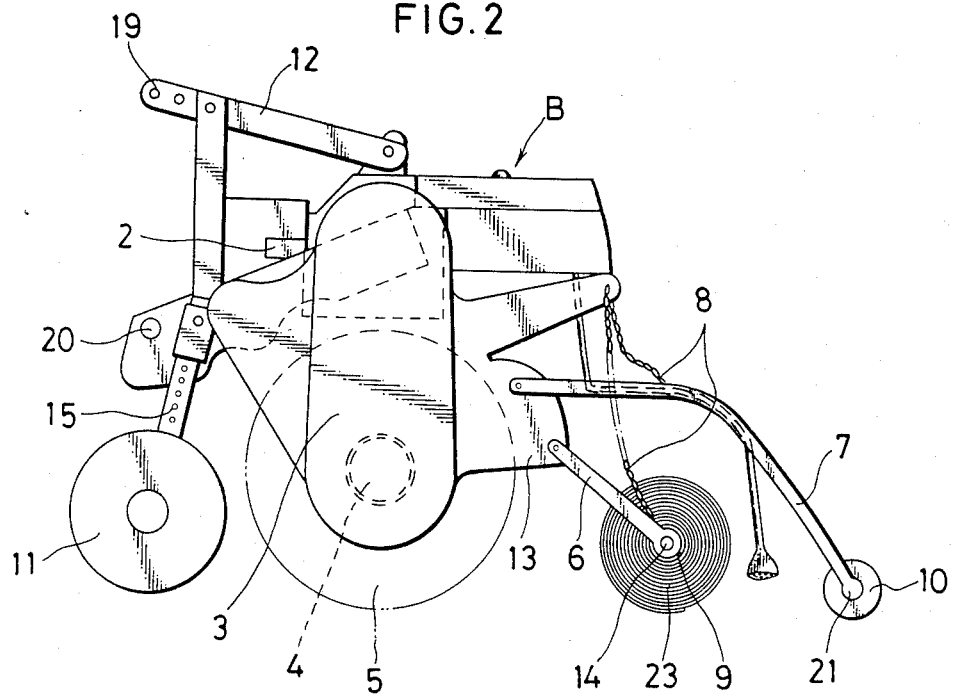
FIG. 2 is a side elevation of the spreading and laying machine of FIG. 1.

Owing to the pivotal connection of the support bars 6 to their corresponding support plates 13, the rolled lawn nursery strips 23 loaded on the nursery strip roller 9 are allowed to rotate while being normally kept in contact with the ground even if the ground is rugged. The firming roller 10 extends rotatably between the rear ends of the support arms 7 of the spreading and laying machine B. The lawn nursery strips 23, which have been paid out rearwardly from the nursery strip roller 9 and have thus been spread and laid over the ground, are pressed at a constant pressure by the firming roller 10 so that the lawn nursery strips 23 are brought into close contact with the ground without developing crumples and the like. Similar to the nursery strip roller 9, the support arms are pivotally connected to the main body of the spreading and laying machine B. Therefore, the firming roller 10 is normally allowed to roll in contact with the ground no matter how much the ground is rugged. As shown clearly in FIG. 2, numeral 11 indicates a pair of gauge wheels which rotate respectively on both sides of the main body of the spreading and laying machine B. Each of these gauge wheels 11 is composed of a planar disk. The rotary shaft of each gauge wheel 11 is connected to the main body of the spreading and laying machine B by way of a height-adjusting bar 15, whereby making it possible to adjust the depth to which the claws 5 provided on the rotary shaft 4 would extend into the top soil. The height-adjusting bars 15 permit pre-adjustment of the thickness of top dressing soil to be sprinkled over the spread and laid lawn nursery strips 23. Alternatively, the adjustment of the thickness of top dressing soil may also be effected by moving the attachment portion of a lever 12, at which portion the lever 12 is connected by a bolt to the three-point link mechanism of the tractor A. As another alternative, it may also be effected by controlling the position of the tractor A. The extent of positional adjustment of the claws 5 may range from 1 mm to 2 cm or preferably 3 mm to 7 mm in terms of the resulting thickness of the top dressing soil. Numeral 19 indicates a connecting part to the top link of the three-link mechanism of the tractor A, while numeral 20 designates a connecting part to the lower link.

The operation of the spreading and laying machine B will next be described.

The nursery strip roller 9 is rotatably supported on the rear end portions of the support plates 6. The spreading and laying machine B is then connected to the tractor A. At the same time, the drive shaft 1 is connected to the power input shaft 2, and the upper link and lower link of the tractor A are coupled respectively to the connecting parts 19 of the lever 12 and the connecting part 20. When the tractor A is driven, the lawn strip spreading and laying machine B of this invention is towed by the tractor. At the same time, the rotary shaft 4 is rotated owing to the rotation of the power input shaft 2. Accordingly, the claws 5 arranged side by side on the rotary shaft 4 are caused to rotate, about the shaft 4, in a direction opposite to the travelling direction of the tractor A so that a suitable amount of the top soil is scraped and sprinkled rearwards.

Owing to the towing of the spreading and laying machine B by the tractor A, the nursery roller 9 is also caused to rotate while releasing the lawn nursery strips 23 rearwards. At the same time, the firming roller 10 is caused to rotate while pressing the thus-released lawn nursery strips 23 against the ground. The thus-laid lawn nursery strips 23 are then covered to a suitable thickness by the top dressing soil 22 sprinkled rearwards by the claws 5. The soil-covered lawn nursery strips 23 are then watered if necessary. A water-sprinkler may additionally be provided on the spreading and laying machine B. For example, a water sprinkler (24), which may consist of a tank and nozzle, distributes water on the thus-laid seed nursery strip (23). In the above-mentioned manner, a number of lawn nursery strips can be spread and laid efficiently on the ground. As the rolled lawn nursery strips 23 are released, their diameters decrease. Since the support bars 6 are pivotally attached to the spreading and laying machine B, the supports 16 are lowered to keep the rolled lawn nursery strips 23 in contact with the ground.

Owing to the above-described construction, the spreading and laying machine B of this invention has brought about such excellent advantageous effects that seed nursery strips, notably, lawn nursery strips can be automatically and stably spread and laid even if they have somewhat weak tensile strength and at the same time, top dressing soil can be applied to a desired thickness over the thus-laid nursery strips.

Having now fully described the invention, it will be apparent to one of ordinary skill in the art that many changes and modifications can be made thereto without departing from the spirit or scope of the invention as set forth herein.

What is claimed is:

1. A soil laminating machine for applying a seed nursery strip of flat, prefabricated webbing material between soil layers, comprising a main body having attached thereto:

means for spreading and laying at least one seed nursery strip onto the ground;

means for compressively flattening across the thus-spread and laid seed nursery strip;

tiller means for clawing, lifting, and throwing the topsoil of the ground in a rearward direction onto the seed nursery strip, said tiller means positioned in front of the spreading and laying means, whereby even sprinkling of the thus clawed, lifted and thrown topsoil as a top dressing soil over the compressively flattened seed nursery strip will be attained, means for adjusting the operating depth of the tilling means relative to the ground so that the thickness of the dressing soil can be controlled to be within a range of from 1 mm to 2 cm and said means for adjusting is composed of at least one gauge wheel and a height-adjusting bar connecting the gauge wheel to the main body and, wherein the tiller means is composed of a multiplicity of claws provided on a rotary shaft, and means rotating the rotary shaft in a direction opposite to the direction the gauge wheel rotates.

2. A soil laminating machine as claimed in claim 1, wherein the gauge wheel is disposed in front of the tiller means.

3. A laminating machine as claimed in claim 1, wherein said at least one seed nursery strip is in a rolled form, and the spreading and laying means is a shaft which extends in a direction perpendicular to the travelling direction of the laminating machine and is attached pivotally and detachably to the main body of the laminating machine by an attaching means so that in operation, the rolled nursery strip is fit on the shaft and is then paid out from the shaft.

4. A laminating machine as claimed in claim 1, wherein the means for compressively flattening is a roller connected pivotally by a connecting means to the main body of the laminating machine.

5. A laminating machine as claimed in claim 1, wherein the laminating machine further comprises a water sprinkler, whereby to sprinkle water to the thus-laid seed nursery strip.

* * * * *